United States Patent [19]
Lee

[11] Patent Number: 5,939,979
[45] Date of Patent: Aug. 17, 1999

[54] VEHICLE LIGHT SYSTEM CAPABLE OF DISPLAYING AN ILLUMINATED SYMBOL

[75] Inventor: Howard Hong-Dough Lee, Bloomfield, Mich.

[73] Assignee: Intellectual Science and Technology Inc., Bloomfield, Mich.

[21] Appl. No.: 08/710,394

[22] Filed: Sep. 16, 1996

Related U.S. Application Data

[63] Continuation-in-part of application No. 07/847,609, Mar. 5, 1992, abandoned.

[51] Int. Cl.[6] .................................................. B60Q 1/44
[52] U.S. Cl. ..................... 340/479; 340/468; 340/471; 362/80
[58] Field of Search .................................... 340/425.5, 463, 340/438, 468, 479, 470, 461, 471; 362/80, 84, 806, 61, 83.3; D26/28, 32, 118, 139; 40/556

[56] References Cited

U.S. PATENT DOCUMENTS

| | | | |
|---|---|---|---|
| 2,044,300 | 6/1936 | Heans | 340/470 |
| 2,644,148 | 6/1953 | Nolcox | 340/470 |
| 2,673,307 | 3/1954 | Weishuhn | 340/470 |
| 2,854,650 | 9/1958 | Baker et al. | 340/470 |
| 4,443,832 | 4/1984 | Kanamori et al. | 362/84 |
| 4,494,326 | 1/1985 | Kanamori | 40/593 |
| 4,791,402 | 12/1988 | Vaughn | 340/468 |

*Primary Examiner*—Brent A. Swarthout
*Attorney, Agent, or Firm*—Hartman and Hartman, P.C.

[57] ABSTRACT

A light system of a vehicle is made to comprise light cover means having at least one light-illuminable area for luminously displaying a symbol corresponding to a vehicle's trademark or a manufacturer's mark when the vehicle is initiated by a driver to perform an action such as braking, parking-signalling, hazard-signalling, turn-signalling, driving, reverse-driving, or door-opening. When implemented, the present invention economically and effectively vivifies the illumination appearance of a vehicle not only in the daylight but in the dark.

11 Claims, 5 Drawing Sheets

VEHICLE LIGHT SYSTEM CAPABLE OF DISPLAYING AN ILLUMINATED SYMBOL

This application is a continuation-in-part of application Ser. No. 07/847,609, filed on Mar. 5, 1992, now abandoned.

FIELD OF THE INVENTION

The present invention relates generally to a vehicle light system capable of displaying an illuminated symbol, and more particularly to a vehicle light system capable of luminously displaying a symbol corresponding to a vehicle's trademark or a manufacturer's mark when the vehicle is initiated by a driver to perform an action such as braking, parking-signalling, hazard-signalling, turn-signalling, driving, reverse-driving, or door-opening.

BACKGROUND OF THE INVENTION

It is customary for one to identify the brand or the maker of a vehicle from its carried medal- or panel-like symbol representing a vehicle's trademark or a manufacturer's mark. However, in the dark, a conventional symbol cannot be identified unless being properly exposed to light. There exists a type of so-called self-illuminating symbol, in which a symbol is luminously displayed for arising an ornamentation effect as exemplified in a U.S. Pat. No. 4,443,832 issued to Kanamori et al. Implementation of a self-illuminating symbol is costly because it requires not only expensive new stamping dies for making a new hole on a vehicle's body panel to accommodate this type of self-illuminating symbol therein, but a new light source for arising the ornamentation effect.

There are instances in which a symbol is simply attached onto the light cover of a vehicle's taillamp cover or front light cover. These instances can be classified into two categories as represented by the following typical examples. Most of the instances belong to the first category in which a symbol and its field are in a form of a panel-like light-impenetrable plate and thus cannot be luminously displayed, for example, the symbol of Oldsmobile on the taillamp cover of a 1989 Oldsmobile Cutlass Ciera sedan.

In the second category, a vehicle light cover is made to consist of a light-impenetrable symbol, and a light-illuminable field and a light-illuminable outer background both contiguous to the light-impenetrable symbol. A typical example of this category is the symbol of Mercury attached to the light cover located at the front center of a 1991 Ford Mercury Sable sedan. The symbol of Mercury is basically in a form of skeleton or framework with a metallic-shinning surface; and, the field of the symbol has a color and luminous intensity identical to the outer background. This offers no illumination pattern corresponding to the shape of the symbol of Mercury for two reasons. First, the symbol itself is light-impenetrable. Secondly, the bright light emitting from the light bulb behind the light cover brightly illuminates the field and the background in the same color, therefore rendering the symbol unrecognizable from the surroundings.

A further typical example of the second category is the symbol of Oldsmobile seen on the taillamp of a 1991 GM Oldsmobile Cutlass Supreme sedan, which is made of a cheap black imprint rather than an expensive metallic framework as used in the Mercury example. As proportionally depicted in FIG. 1, taillamp cover means 100 comprises a light-impenetrable black symbol 101 having a pattern corresponding to the trademark of Oldsmobile that does not allow light rays to pass therethrough. a light-illuminable red field 102 and a light-illuminable red outer background 103. The inner surface of taillamp cover means 100 is finished in a manner such as to diffuse light into a pattern consisting of alternatively arranged bright-red regions 104 and the dark-red regions 105 with a size as proportionally shown in FIG. 1. This prior art fails to luminously display the symbol of Oldsmobile for three reasons. The first is that the size of the dark-red regions 105 being in the range of 0.4–0.5 cm is larger than the width range of 0.1–0.3 cm of the light-illuminable red field 102, severely obscuring the illumination pattern of the light-illuminable red field 102. The second is that there exists no boundary between the light-illuminable red field 102 and the light-illuminable red outer background 103. Most important is the third reason that the light-impenetrable black symbol 101 does not allow light to pass therethrough, and its surroundings including the light-illuminable red field 102 and the light-illuminable red outer background 103 have the same red color, rendering the illumination pattern of the field unrecognizable from the red outer background 103. In essence, similar to the Mercury example, neither the Oldsmobile symbol nor its field is made luminously recognizable on the taillamp cover means 100.

In summary, up to now, none of the available vehicle light systems has being intentionally designed to utilize the existed light sources for the luminous displaying of a vehicle's trademark at the time when its host vehicle is initiated by a driver to perform an action of braking, parking-signalling, hazard-signalling, turn-signalling, driving, reverse-driving, or door-opening.

OBJECTS OF THE INVENTION

Accordingly, a primary object of the present invention is to economically and effectively provide a light system by which a symbol corresponding to a vehicle's trademark or a manufacturer's mark is luminously displayed when its host vehicle is initiated by a driver to perform an action selected from the group consisting of braking, parking-signalling, hazard-signalling, turn-signalling, driving, reverse-driving, and door-opening.

A further object of the present invention is to provide a light system for a vehicle by which the field of a symbol is made luminously recognizable from its surroundings, forming a reverse image of the symbol so as to improve the illumination identification of the vehicle in the dark.

SUMMARY OF THE INVENTION

The foregoing object of economically and effectively vivifying a vehicle's illumination appearance is accomplished by providing a vehicle a light system with light cover means of the present invention comprising a light-illuminable symbol or design pattern corresponding to a vehicle's trademark or manufacturer's mark. Since capable of vivifying the illumination appearance of a vehicle, the present invention thus offers an excellent aid to law enforcement agencies and civilian eye-witnesses in easily establishing positive identification of an accident-involved vehicle especially in the dark so as to make a hit-and-run case to become more resolvable.

A first preferred embodiment of the present invention is to provide a vehicle a light system with light cover means comprising one light-illuminable area that is made into a shape or pattern of a symbol corresponding to a vehicle's trademark or a manufacturer's mark. When the vehicle is initiated by a driver to perform an action such as braking, parking-signalling, hazard-signalling, turn-signalling, driving, reverse-driving, or door-opening, the symbol is luminously displayed in a distinct manner.

A second preferred embodiment of the present invention is to provide a vehicle a light system with light cover means comprising a first light-illuminable area having a shape of a symbol corresponding to a trademark, and a second light-illuminable area representing either the field or the outer background of the symbol, wherein the second light-illuminable area is illuminated into a color different from the first light-illuminable area. When the vehicle is initiated by a driver to perform an action such as braking, parking-signalling, hazard-signalling, turn-signalling, driving, reverse-driving, or door-opening, the symbol and its field are harmonically and luminously displayed.

A third preferred embodiment of the present invention is to provide a vehicle a light system with light cover means comprising a first area being light-impenetrable and having a shape of a symbol corresponding to a trademark, a second area being light-illuminable that represents the field of the symbol, and a third area representing the outer background of the symbol which is made of either a light-impenetrable material or a material light-illuminable into a color different from the field, so as to luminously display the field and/or the outer background in different color as a reverse image of the symbol when the vehicle is initiated by a driver to perform an action such as braking, parking-signalling, hazard-signalling, turn-signalling, driving, reverse-driving, or door-opening.

A fourth preferred embodiment of the present invention is to provide a vehicle a light system with light cover means comprising a first area being light-illuminable and having a shape of a symbol corresponding to a trademark, and a second area being light-impenetrable and contiguously surrounding the outermost boundary of the symbol, so as to luminously display the symbol in a discrete manner when the vehicle is initiated by a driver to perform an action such as braking, parking-signalling, hazard-signalling, turn-signalling, driving, reverse-driving, or door-opening.

These and other features for accomplishing the objects of the present invention will become apparent upon reading the following description thereof together with the reference to the accompanying figures in which:

DETAILED DESCRIPTION OF THE PREFERRED EMBODIMENT

Figure 1:
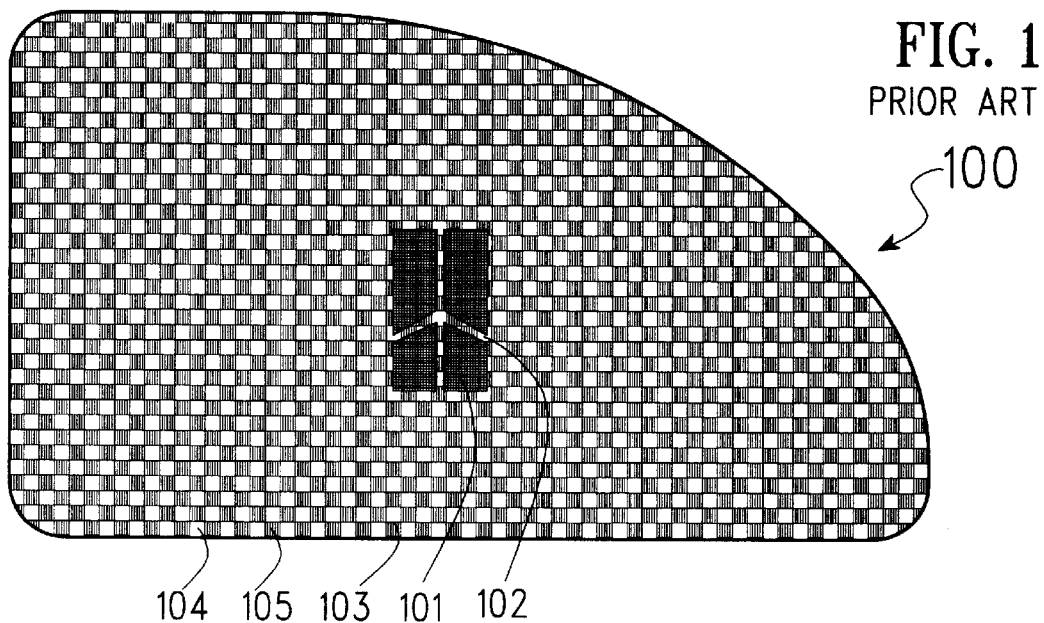
FIG. 1 is an illustrative view of a conventional taillight cover means seen on a 1991 GM Oldsmobile Cutlass Supreme sedan.
Figure 2:
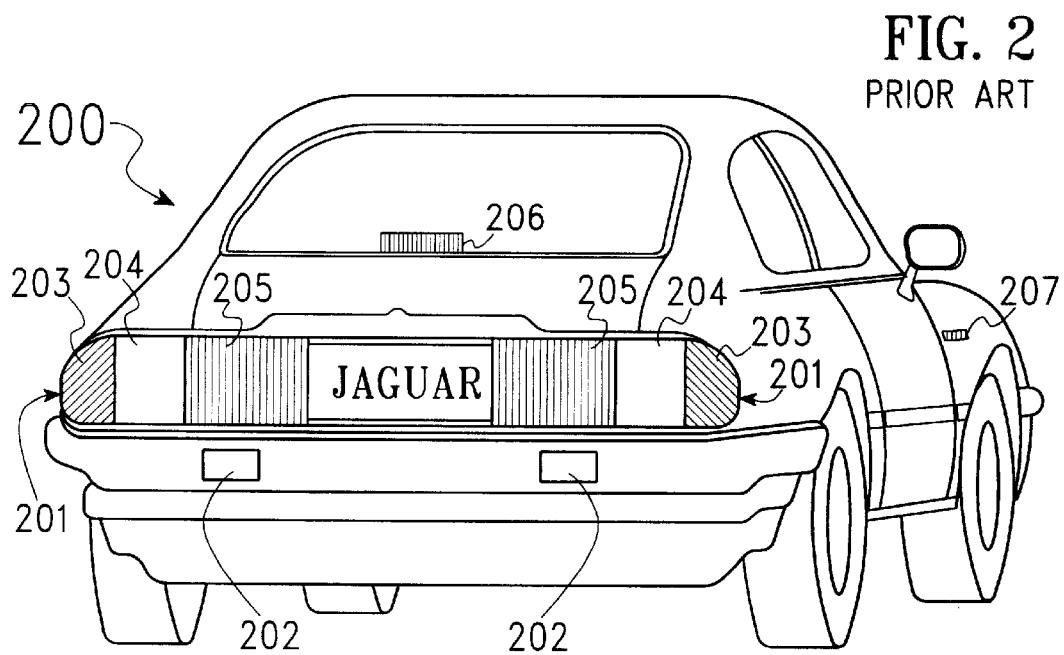
FIG. 2 is a perspective, side-rear view of a vehicle with lights all in a conventional style.

Referring now to a typical example of the prior art, FIG. 2 displays a perspective, side-rear view of vehicle 200 (1991 Jaguar XJ-S coupe) having two taillamp sets 201, two reverse-drive lights 202, one auxiliary stop light 206, and a sidemarker 207 that are all in a conventional style. Each of taillamp sets 201 consists of turn lights 203, stop lights 204, and night-driving lights 205. Because these conventional lights are all in a simple rectangular or square shape as used in most of other vehicles, vehicle 200 in the dark loses not only its distinct identity but also appearance attraction.

Figure 3:
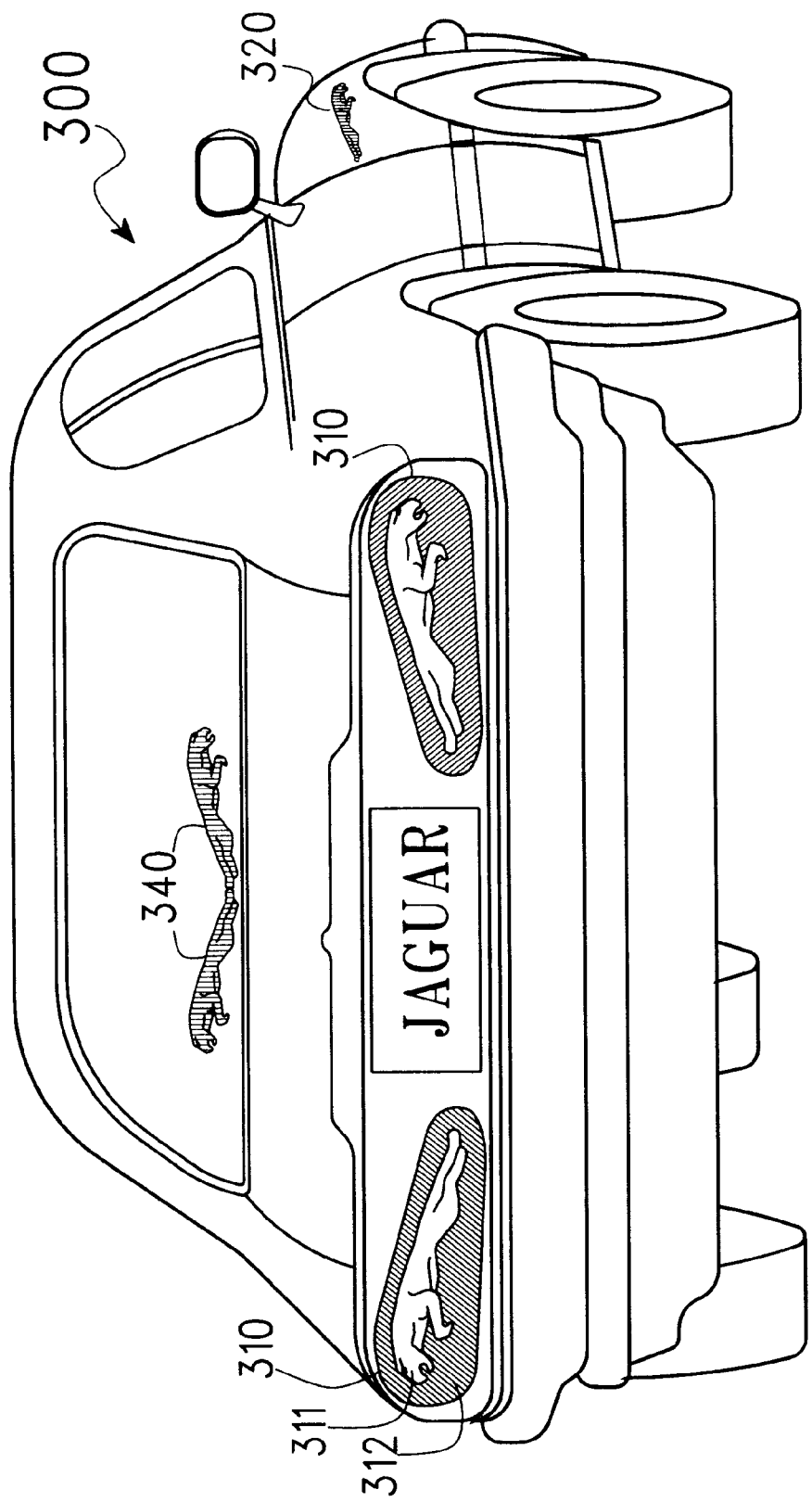
FIG. 3 is a perspective, side-rear view of a vehicle with a light system in accordance with a first preferred embodiment of the present invention.

FIG. 3 displays the perspective, side-rear view of a vehicle 300 with various lights in accordance with the first preferred embodiment of the present invention. These lights include taillamps 310, sidemarker 320, and auxiliary stop light 340. Each taillamp 310 is designed to be capable of providing multiple signalling functions for signalling turning, driving, reverse-driving, braking or stopping, hazard-situation, and parking actions of vehicle 300. In accordance with the prior art, each of the multiple signalling functions is to the contrary performed by a separate light device including turn light 203, stop light 204, and night-driving light 205 seen in FIG. 2. This simplified construction allows a vehicle manufacturer to substantially cut production costs.

Sidemarker 320 and auxiliary stop light 340 are all characterized by the fact that their light cover means are made into a shape of Jaguar corresponding to the manufacturer's trademark. Each of these light cover means is made of a single-piece light-illuminable plastic plate.

The light cover means of each taillamp 310 is made to comprise one light-illuminable area 311 being made using a light-illuminable material into a shape of a symbol corresponding to the trademark of Jaguar, and a light-impenetrable background area 312 being made of a light-impenetrable material that contiguously surrounds light-illuminable area 311. When vehicle 300 performs a driver-initiated vehicle action such as braking or stopping, parking-signalling, hazard-signalling, turn-signalling, driving in the dark, and/or reverse-driving, the trademark of Jaguar is distinctly displayed on respective lights. As compared with the prior art, the present invention embodied in FIG. 3 effectively vivifies the illumination appearance of vehicle 300 not only in the daylight but also in the dark.

Figure 4:
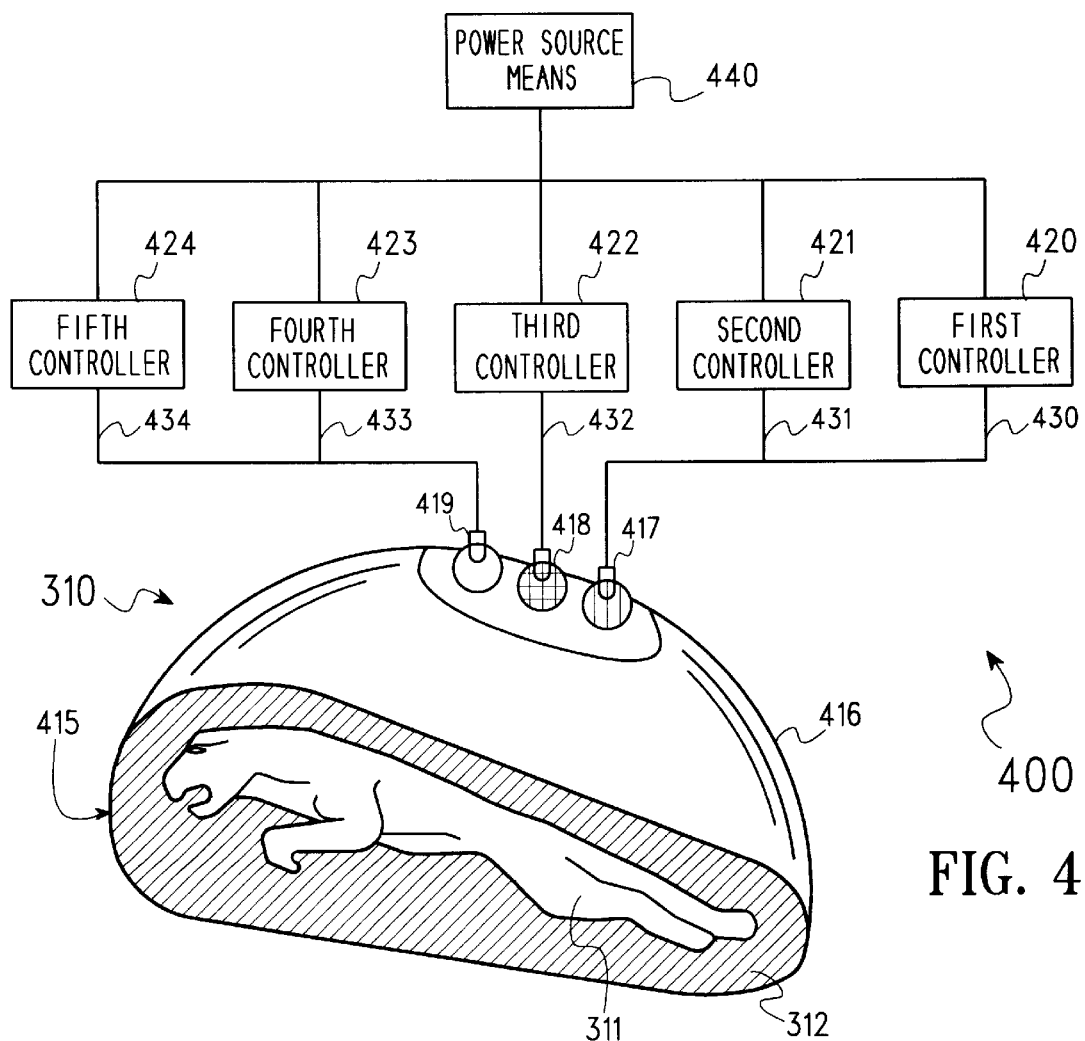
FIG. 4 is an illustrative view of a tail light system in accordance with the first preferred embodiment of the present invention.

FIG. 4 is an illustrative view of a tail light system 400 to be used for further describing the first preferred embodiment of the present invention. Tail light system 400 comprises a taillamp 310, power lines 430–434, power-supply controllers 420–424, and power source means 440. Comprised in taillamp 310 are light cover means 415, and a light reflector 416 in a cut-away view therein showing a red light bulb 417, a yellow light bulb 418, and a colorless light bulb 419. Light cover means 415 is disposed to cover light bulbs 417–419 with a space therebetween for defining the illumination pattern of taillamp 310. The outer surface of light cover means 415 is flat and smooth for facilitating its cleaning, but its inner surface is finished (to be explained in FIG. 6) so as to give better illumination evenness and to prevent recognition of light bulbs 417–419 therethrough from the outside. Comprised in light cover means 415 are light-illuminable area 311 that is made into a shape corresponding to the trademark of Jaguar using a light-illuminable material having an opal-white color, and light-impenetrable background area 312 being made of a light-impenetrable material. Therefore, the symbol of Jaguar is illuminated in a color controlled by the color of the light rays emitted from light bulbs 417–419. Light reflector 416 is utilized to direct or reflect the light rays emitted from light bulbs 417–419 towards light cover means 415 and to serve as a structural base for holding light cover means 415 and light bulbs 417–419 and for allowing lamp 310 to become attachable to the body of vehicle 300 seen in FIG. 3.

Electric power distributed through power lines 430 and 431 from power source means 440 to red light bulb 417 is respectively controlled by a first controller 420 capable of being manually turned on for signalling a night driving action and by a second controller 421 responsive to a braking or stopping action of vehicle 300. Red light bulb 417 is a two-stage bulb capable of emitting regular red light rays when first controller 420 is manually turned on during night driving, and of emitting intensified red light rays when vehicle 300 is initiated by a driver to perform a braking action. Electric power distributed through power line 432 to yellow light bulb 418 is controlled by a third controller 422 for providing an intermittent, yellow-colored jaguar to signal either a left- or right-turn action of vehicle 300. On the other hand, electric power distributed thought power lines 433 and 434 to colorless light bulb 419 is controlled respectively by a fourth controller 423 for signalling a hazard situation and by a fifth controller 424 for signalling a reverse-drive action: thus, taillamp 310 displays an intensified, white-colored jaguar in an intermittent or a continuous manner for signalling a hazard situation or a reverse-drive action, respectively.

The shape of background area 312 is designed in harmony with the shape of light-illuminable area 311 and/or the overall style or appearance of vehicle 300 so that the illuminated appearance and the non-illuminated appearance of vehicle 300 can be harmonically vivified. Background area 312 can be made of a light-impenetrable green-colored material, for instance, for matching the body color of vehicle 300, or of a light-illuminable material having a color other the opal-white color of the symbol for harmonically vivifying the overall illumination pattern of tail light system 400.

Figure 5:
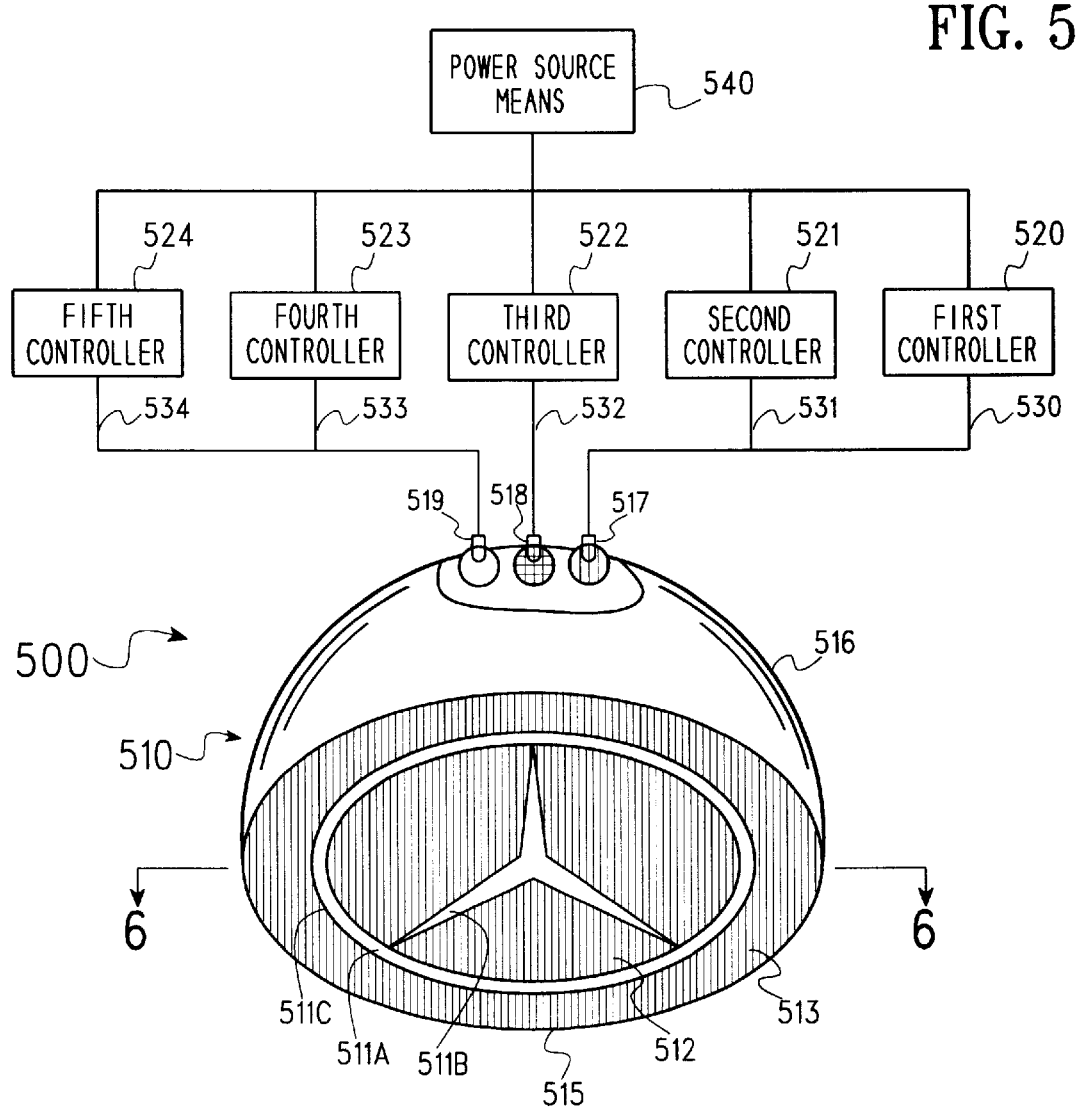
FIG. 5 is an illustrative view of a light system in accordance with the first, second, and third preferred embodiments of the present invention.

FIG. 5 is an illustrative view of a light system 500 to be used for describing the first, second, and third preferred embodiments of the present invention. Light system 500 is able to luminously display various color patterns in connection with the symbol of Mercedes-Benz AG for signalling a driver-initiated vehicle action such as braking, parking-signalling, hazard-signalling, turn-signalling, driving, reverse-driving, or door-opening. Comprised in light system 500 are power source means 540 for providing electric power, power-supply controllers 520–524 for controlling the supply, of electric power to selected light bulbs, power lines 530–534 for the distribution of electric power respectively from power-supply controllers 520–524 to light bulbs 517–519, and a lamp 510 that comprises light cover means 515 defining the illumination pattern of light system 500, a light reflector 516, a red light bulb 517 capable of emitting regular and intensified red light rays, a yellow light bulb 518 for emitting intermittent yellow light rays, and a colorless light bulb 519 for emitting intensified colorless light rays.

Comprised in light cover means 515 (FIG. 5) are first area 511 (including 511A and 511B) being made into the shape of a symbol corresponding to the trademark of Mercedes-Benz AG, second area 5 12 substantially contiguous to first area 511 that represents the field of the symbol, and third area 513 contiguously surrounding the outermost boundary 511C of first area 511 that represents the outer background of the symbol.

Figure 6:
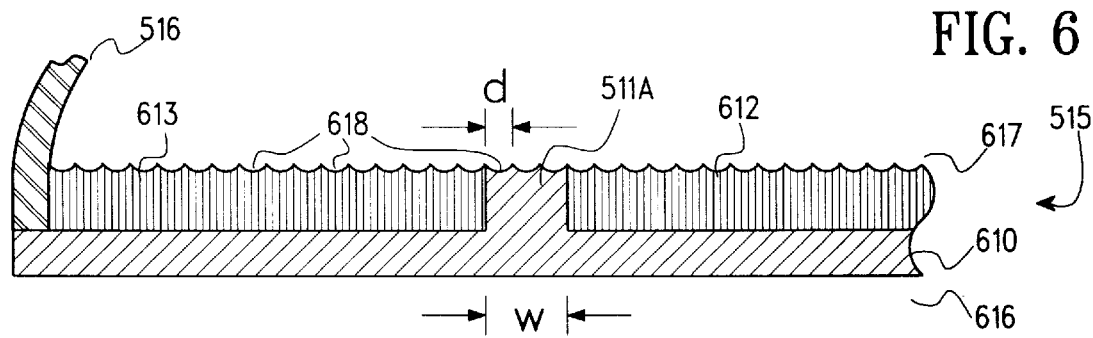
FIG. 6 is an enlarged sectional view of the light cover means taken along the line A—A of FIG. 5.

An enlarged sectional view of the left-hand side of light cover means 515 taken along the line 6—6 of FIG. 5 is shown in FIG. 6 that will be used in conjunction with FIG. 5 for describing the first and the second embodiments of the present invention. Light cover means 515 is considered to consist of two cover members: base-cover member 610 having outer surface 616 and a defined first area 511 (only 511A is depicted in FIG. 6), and inner-cover members 612 and 613 respectively being made into the shapes of second area 512 (the field) and third area 513 (the background). Both inner-cover members 612 and 613 are tightly attached to base-cover member 610. Base-cover member 610 and inner-cover member 613 are further adhered to light reflector 516. The outer surface 616 of base-cover member 610 is flat and smooth for facilitating its cleaning, but surface 617 facing light bulbs is preferably finished into small regions 618 each with at least two angled surfaces in order to diffuse the light rays emitted from light bulbs 517–519 (FIG. 5) for giving better illumination evenness and for preventing recognition of the light bulbs therethrough from the outside. Preferably, each of small regions 618 is made to have a width d finer than most of the widths w of first area 511 so that any weakly-lighted spot formed within each small region 618 has a width also smaller than w, therefore allowing the symbol to be luminously displayed in detail.

In accordance with the first preferred embodiment of the present invention, first area 511 is the only light-illuminable area on light cover means 515 and is in an opal-white color. For this purpose, base-cover member 610 is made of a light-illuminable material having an opal-white color, while inner-cover members 612 and 613 are made of a light-impenetrable material. Thus, light cover means 515 will luminously display only the symbol of Mercedes-Benz AG with a color controlled by light bulbs 517–519, when its host vehicle is initiated by a driver to perform an action such as braking, parking-signalling, hazard-signalling, turn-signalling, driving, reverse-driving, or door-opening.

In accordance with the second preferred embodiment of the present invention, light cover means 515 comprises at least two light-illuminable areas: first area 511 and second area 512. For this purpose, base-cover member 610 that defines first area 511 is made of a light-illuminable material with an opal-white color, and inner-cover member 612 that defines second area 512 is made of a material light-illuminable into a color different from first area 511. Inner-cover member 613 that defines third area 513 is made of either a light-impenetrable material or a material light-illuminable into a color different from first area 511. The difference in illumination color between the symbol and its surroundings renders the symbol harmonically visible in the dark and in the daylight, when a vehicle is initiated by a driver to perform an action such as braking, parking-signalling, hazard-signalling, turn-signalling, driving, reverse-driving, or door-opening.

In accordance with the second preferred embodiment of the present invention, on light cover means 515, first area 511 corresponding to the trademark of Mercedes-Benz AG (i.e., the symbol hereinafter) is made of a light-illuminable opal-white-colored material, second area 512 representing the field of the symbol is made of a light-impenetrable material, while third area 513 representing the outer background of the symbol is made of a light-illuminable red-colored material that has a color different from the symbol. Thus the symbol corresponding to the trademark of Mercedes-Benz AG is luminously displayed on light cover means 515, when its host vehicle is initiated by a driver to perform an action such as braking, parking-signalling, hazard-signalling, turn-signalling, driving, reverse-driving, or door-opening.

In accordance with the third preferred embodiment of the present invention, first area 511 corresponding the trademark of Mercedes-Benz AG (i.e., the symbol hereinafter) is light-impenetrable, second area 512 representing the field of the symbol is light-illuminable, and third area 513 is made of either a light-impenetrable material or a material light-illuminable into a color different from the field. This allows the field to be luminously visible and recognizable from the surroundings so as to illuminate the field as a reverse image of the symbol, when its host vehicle is initiated by a driver to perform an action such as braking, parking-signalling, hazard-signalling, turn-signalling, driving, reverse-driving, or door-opening. The third embodiment of the present invention is particularly suitable for the application of a skeleton-like symbol that has a less occupied area as compared with its field, such as the trademarks of Acura, Audi, Honda. Infiniti, Lexus, Lincoln, Mercury, Toyota, and Volkswagen.

Figure 7:
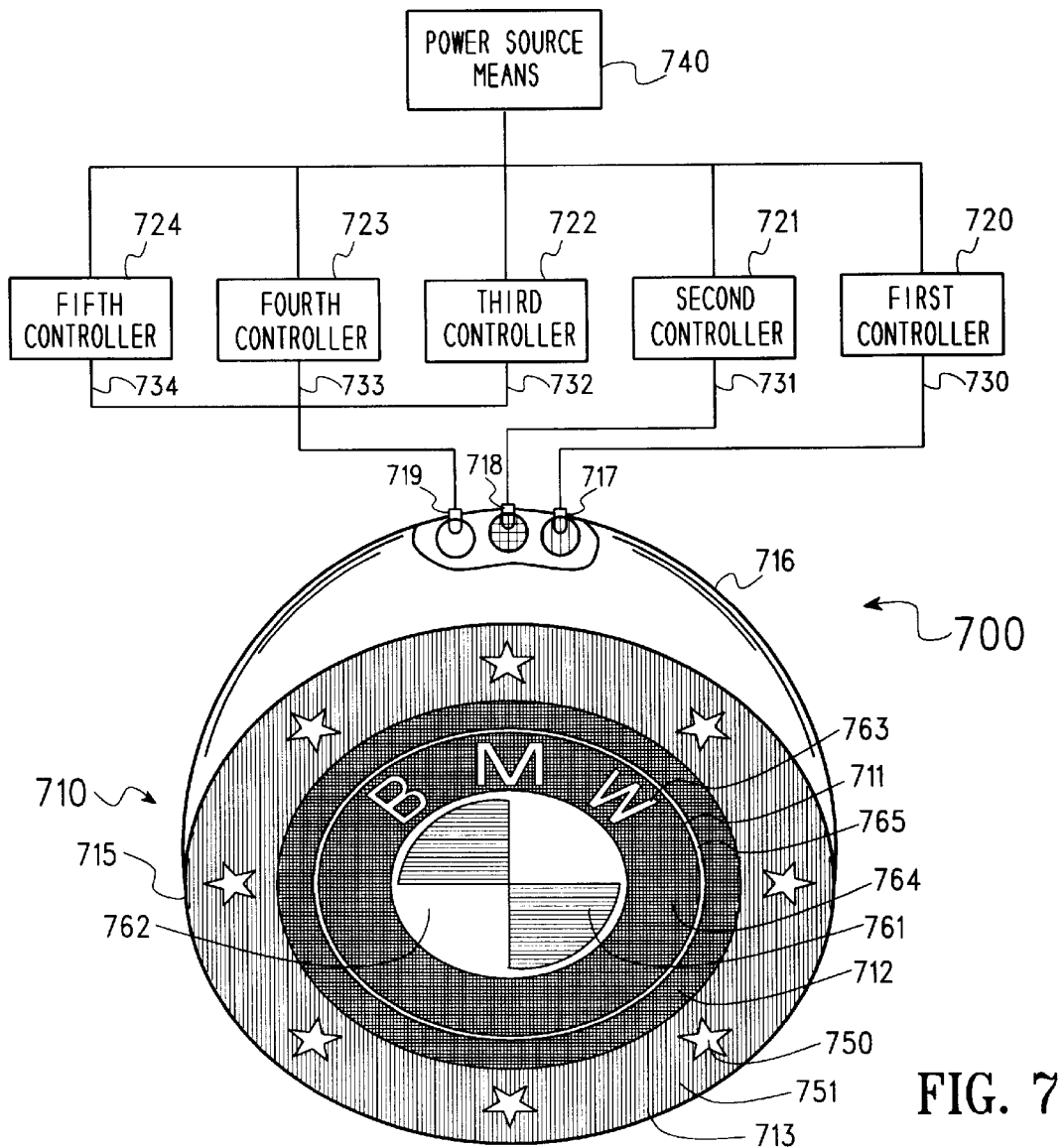
FIG. 7 is an illustrative view of a light system in accordance with a fourth preferred embodiment of the present invention.

FIG. 7 is an illustrative view of a light system 700 to be used for describing the fourth preferred embodiment of the present invention, which allows a symbol to be luminously displayed in a discrete manner as surrounded by a light-impenetrable area and then by another ornamental pattern. Comprised in light system 700 are power source means 740, power-supply controllers 720–724, power lines 730–734, and a lamp 710 comprising light cover means 715 that defines the illumination pattern of lamp 710, a light reflector 716, a red light bulb 717 capable of emitting intensified red light rays for signalling a driver-initiated vehicle braking action through first controller 720, a yellow light bulb 718 capable of emitting intermittent yellow light rays for signalling a driver-initiated vehicle turning action through second controller 721, and a colorless light bulb 719 capable of emitting regular colorless light rays for signalling a normal vehicle driving action in the dark through third controller 722, of emitting intensified intermittent-colorless light rays for signalling a hazard situation through fourth controller 723, and of emitting intensified colorless light rays for signalling a driver-initiated vehicle reverse-driving action through fifth controller 724.

Light cover means 715 comprises first light-illuminable area 711 being made into a shape of a symbol corresponding to the trademark of BMW (Bayerische Motoren Werke) AG, second light-impenetrable area 712 contiguously surrounding the outermost boundary of the symbol, and third area 713 having eight opal-white stars 750 symmetrically distributed on a light-illuminable red background 751 that surrounds the outermnost boundary of second light-impenetrable area 712. Thus, in accordance with the fourth preferred embodiment of the present invention, a light system is able to luminously display a symbol corresponding to a vehicle's trademark or manufacturer's mark in a discrete manner with respect to another light-illuminable ornamental pattern.

First light-illuminable area 711 is made into multiple-colored regions using light-illuminable materials with different colors, forming two blue regions 761, two opal-white regions 762, three opal-white characters 763 ("BMW") on a light-impenetrable black ring 764, and a narrow opal-white ring 765 representing the outermost boundary of the symbol; thus, the symbol is illuminable into multiple colors especially when exposed to colorless light rays emitted from colorless light bulb 719. Opal-white regions 762, narrow opal-white ring 765, opal-white characters 763, and opal-white stars 750 are illuminable into a color selectively between red, yellow, and intensified white as controlled by light bulbs 717–719, respectively. Light cover means of this type can also be served as sidemarkers, twilights, fog-lights, courtesy lights, lock lights, and other convenience-oriented interior lights, which requires only one colorless light bulb and one power-supply controller. Preferably, light system 700 comprises two lamps 710 sharing power source means 740 and power-supply controllers 720–724 for providing a complete signalling range necessary for its host vehicle to perform the driver-initiated vehicle actions of turning, normal driving, reverse-driving, braking, and hazard-signalling.

Other well-known multiple-colored symbols include the trademarks of Alfa Romeo, Buick, Cadillac, Ferrari, Maserati, Nissan, Porsche, Skoda, and SAAB, Accordingly, a symbol corresponding to a vehicle's trademark or a manufacturer's mark is luminously displayed in a manner of multiple colors when a vehicle is initiated by a driver to perform an action such as braking, parking-signalling, hazard-signalling, turn-signalling, driving, reverse-driving, or door-opening.

These four preferred embodiments allow a designer to shift the emphasis of a vehicle's illumination appearance from the surroundings of a symbol to the symbol itself accordingly.

Light cover means of the present invention may be made from assembling several one-color pieces (each representing a symbol, a field, and/or a background) together as described hereinabove in conjunction with FIG. 6, or may be made from printing light-illuminable and light-impenetrable inks onto the inner surface of a single-piece, light-transmissive cover means. Because there involves neither the making of a new hole on a vehicle's body panel nor the assembling of many small parts (especially, a new light source) necessary for forming a self-illuminating symbol as suggested in the Kanamori's patent, the present invention can thus be economically implemented to the existing vehicles.

The scope of the present invention is not restricted to the use of the design pattern of jaguar as shown in FIG. 4 or the manufacturer's marks as shown in FIGS. 5 and 7. In fact, it is possible to design a trademark with a pattern taking a shape from a colt, trooper, cavalier, skylark, sunbird, firebird, thunderbird, cougar, etc. So, the illumination appearance of a vehicle light system can have a shape intimately associated with a vehicle's name. It becomes apparent that a light system of the present invention economically and effectively vivifies the identity and the illumination appearance of a vehicle not only in the daylight but also in the dark. Since capable of effectively vivifying the illumination appearance of a vehicle, the present invention thus offers an excellent aid to law enforcement agencies and civilian eye-witnesses in easily establishing positive identification of an accident-involved vehicle so as to make a hit-and-run case to become more resolvable.

Further, the application of the present invention is not limited to the examples of the lights such as taillamps, sidemarkers, reverse-drive lights, hazard-signalling lights, stop lights, and auxiliary stop lights given hereinbefore. It is understandable that the present invention can be extended to a vehicle interior light system for providing interior illumination and other exterior lights such as twilights, fog-lights, park-signalling lights, courtesy lights, lock lights, and other convenience-oriented lights. A light system in accordance with the present invention can also possess a plurality of lamps (for instance, auxiliary stop lights and stop lights) controlled by the same power-supply controller; and, a plurality of light systems can be designed to share a power source means and other common electronics.

While preferred embodiments of the present invention have been shown and described herein, it will be understood that such embodiments are provided by way of example only. Numerous variations, changes, modification, and substitutions will occur to those skilled in the art without departing from the invention herein. Accordingly, it is intended that the invention be limited only by the spirit and scope of the appended claims.

What is claimed is:

1. A vehicle light system comprising:
   (a) power source means;
   (b) light-emitting means for emitting light rays when receiving electric power from said power source means;
   (c) power-supply control means for controlling the supply of said electric power to said light-emitting means, said power-supply control means being responsive to a driver-initiated vehicle action selected from the group consisting of braking, parking-signaling, hazard-signaling, turn-signaling, driving, reverse-driving, door-opening, and interior illuminating;
   (d) electric lines for connecting said power source means to said power-supply control means, and for connecting said power-supply control means to said light-emitting means, respectively; and
   (e) cover means disposed to cover said light-emitting means, said cover means comprising:
      a first area having a shape of a symbol, wherein said first area is formed of a light-illuminable material;
      a second area contiguous with said first area and defining a field region surrounded by said first area, wherein said second area is formed of a light-impenetrable material; and
      a third area contiguous with said first area and defining a background region surrounding said first area, wherein said third area is formed of said light-impenetrable material.

2. The light system of claim 1, wherein said cover means has the shape of said symbol.

3. The light system of claim 1, wherein said first area comprises light-illuminable multiple-colored regions such that said symbol is illuminated in multiple colors when receiving the light rays emitted from said light-emitting means.

4. The light system of claim 1, wherein said light-emitting means comprises at least two different-color light bulbs.

5. A vehicle light system comprising:
   (a) power source means;
   (b) light-emitting means for emitting light rays when receiving electric power from said power source means;
   (c) power-supply control means for controlling the supply of said electric power to said light-emitting means, said power-supply control means being responsive to a driver-initiated vehicle action selected from the group consisting of braking, parking-signaling, hazard-signaling, turn-signaling, driving, reverse-driving, door-opening, and interior illuminating;
   (d) electric lines for connecting said power source means to said power-supply control means, and for connecting said power-supply control means to said light-emitting means, respectively; and
   (e) cover means disposed to cover said light-emitting means, said cover means comprising:
      a first area formed of a light-illuminable material in a shape of a symbol;
      a second area contiguous with said first area and defining a field region surrounded by said first area, wherein said second area is formed of a light-illuminable material having a color different from said first area; and
      a third area surrounding said first area so as to be an outer background of said symbol, wherein said third area is formed of a light-illuminable material.

6. The light system of claim 5, wherein said third area surrounds said first area so as to be an outer background of said symbol, said third area being made of a light-impenetrable material.

7. The light system of claim 5, wherein said third area is contiguous with said first area so as to be an inner field of said symbol, said third area being made of a light-impenetrable material.

8. The light system of claim 5, wherein said light-emitting means comprises at least two different-color light bulbs.

9. The light system of claim 5, wherein said first area comprises light-illuminable multiple-colored regions such that said symbol is illuminated in multiple colors when receiving the light rays emitted from said light-emitting means.

10. A vehicle light system comprising:
    power source means;
    light-emitting means for emitting light rays when receiving electric power from said power source means;
    power-supply control means for controlling the supply of said electric power to said light-emitting means, said power-supply control means being responsive to a driver-initiated vehicle action selected from the group consisting of braking, parking-signaling, hazard-signaling, turn-signaling, driving, reverse-driving, door-opening, and interior illuminating;
    electric lines for connecting said power source means to said power-supply control means, and for connecting said power-supply control means to said light-emitting means, respectively; and
    cover means disposed to cover said light-emitting means, said cover means comprising:
       a first area formed of a light-impenetrable material in a shape of a symbol;
       a second area contiguous with said symbol and defining a field within said symbol, said second area being formed of a light-illuminable material; and
       a third area surrounding said first area to define an outer background of said symbol, said third area being formed of a material selected from the group consisting of light-impenetrable materials and light-illuminable materials having a color different from said second area, so as to luminously display said field as a reverse image of said symbol when receiving the light rays emitted from said light-emitting means.

11. The light system of claim 10, wherein said light-emitting means comprises at least two different-color light bulbs.

* * * * *